(12) United States Patent
Totale et al.

(10) Patent No.: US 9,405,514 B1
(45) Date of Patent: Aug. 2, 2016

(54) PROCESS FRAGMENT MANAGEMENT

(71) Applicant: EMC Corporation, Hopkinton, MA (US)

(72) Inventors: Sachin Gopaldas Totale, Bangalore (IN); Ashraf A. Syed, Bangalore (IN); Swathi Natarajan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/671,396

(22) Filed: Mar. 27, 2015

(51) Int. Cl.
*G06F 9/44* (2006.01)
*G06F 9/46* (2006.01)

(52) U.S. Cl.
CPC .. *G06F 8/22* (2013.01); *G06F 8/70* (2013.01); *G06F 9/46* (2013.01)

(58) Field of Classification Search
CPC ................ G06F 8/22; G06F 8/70; G06F 9/46
USPC .................................................. 717/101–105
See application file for complete search history.

(56) References Cited

U.S. PATENT DOCUMENTS

| | | | | |
|---|---|---|---|---|
| 8,010,518 B2* | 8/2011 | Petri | ................... | G06F 17/2229 707/705 |
| 8,627,271 B2* | 1/2014 | Reed | ...................... | G06Q 10/00 705/50 |
| 8,849,747 B2* | 9/2014 | Balko | ................... | G06Q 10/067 707/602 |
| 2013/0138473 A1* | 5/2013 | Balko | ................... | G06Q 10/04 705/7.27 |
| 2015/0046902 A1* | 2/2015 | Kumar | ..................... | G06F 8/31 717/114 |

OTHER PUBLICATIONS

Jana Koehler et al., "IBM WebSphere Developer Technical Journal: Process anti-patterns: How to avoid the common traps of business process modeling", Part 1, Feb. 2007, IBM WebSphere Developer Technical Journal, pp. 1-20.*
Jana Koehler et al., "IBM WebSphere Developer Technical Journal: Process anti-patterns: How to avoid the common traps of business process modeling", Part 2, Feb. 2007, IBM WebSphere Developer Technical Journal, pp. 1-23.*
EMC, "Getting Started with xCP 2.0", XCP2.0 Self-Paced Tutorial, Dec. 2012 (207 pages).
"EMC Documentum xCP Designer Help Version 2.0 User Guide", EMC Corporation, 2012 (325 pages).
"EMC Documentum xCelerated Composition Platform Designer Help Version 2.1 User Guide", EMC Corporation, Corporate Headquarters, Hapkinton, MA, 2014 (373 pages).
"EMC Documentum xCelerated Composition Platform: Version 2.1 Developer Guide", EMC Corporation, Corporate Headquarters, Hopkinton, MA, 2014 (82 pages).

* cited by examiner

*Primary Examiner* — Ted T Vo
(74) *Attorney, Agent, or Firm* — Osha Liang LLP

(57) ABSTRACT

Process fragment management includes obtaining, during execution of a parent process, a process fragment expression, executing the process fragment expression using data gathered from a data source to obtain a process fragment identifier, and selecting, from multiple process fragments, a process fragment corresponding to the process fragment identifier. The process fragment is executed, and execution completes at a fragment output control point of multiple fragment output control points. From multiple parent input control points of the parent process, a parent input control point matching the fragment output control point is selected and, execution of the parent process continues.

20 Claims, 8 Drawing Sheets

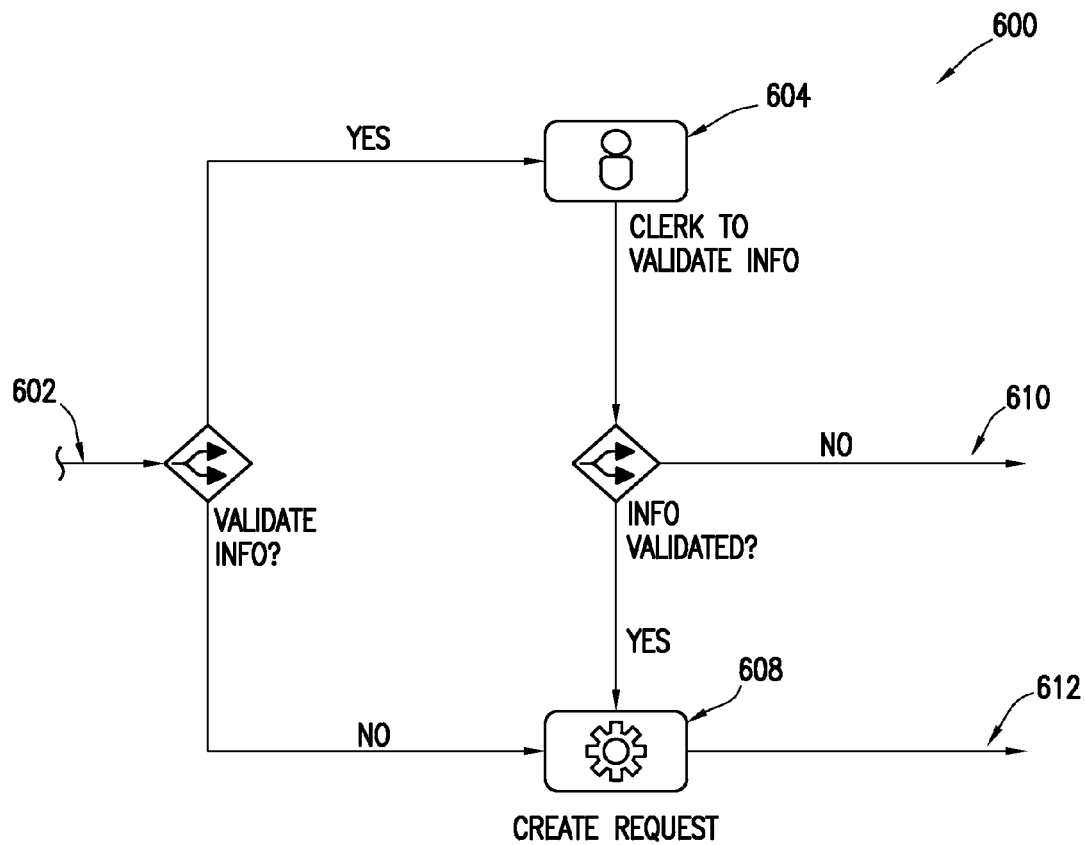
FIG. 6.1

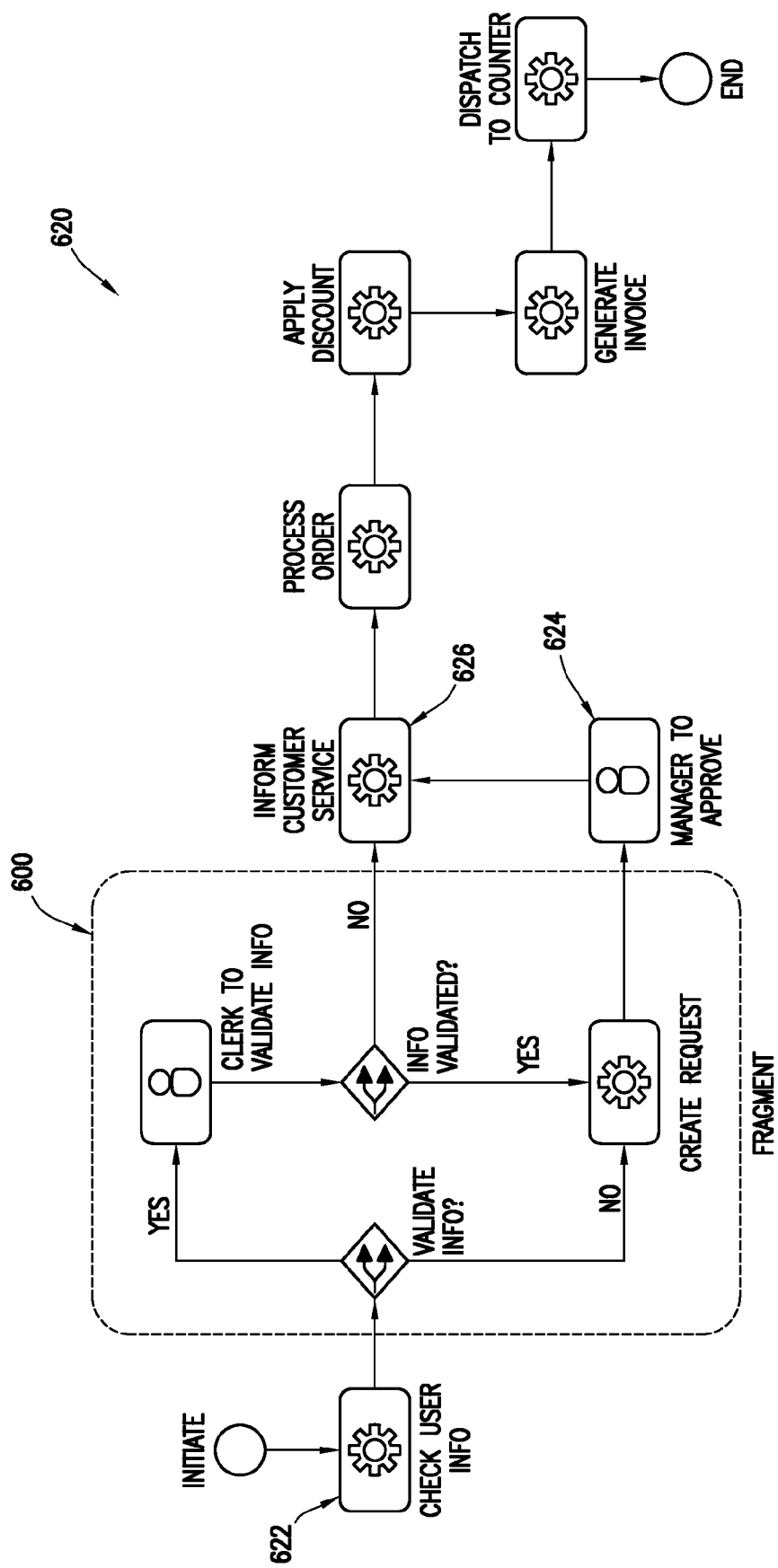
FIG. 6.2

PROCESS FRAGMENT MANAGEMENT

BACKGROUND

In programming, code reuse is often performed by a developer including an instruction in parent code that makes a call to target code, such as a library or a method in another class. In such a situation, the target code has a single defined input control point, which executing the instructions in the target code starts. Similarly, the position to which execution returns in the parent code is a single well-defined position. Code reuse may alternatively involve a developer copying the instructions of the target code directly into the parent code.

BRIEF DESCRIPTION OF DRAWINGS

FIGS. 6.1 and 6.2 show an example in accordance with one or more embodiments of the technology.

DETAILED DESCRIPTION

Figure 1:
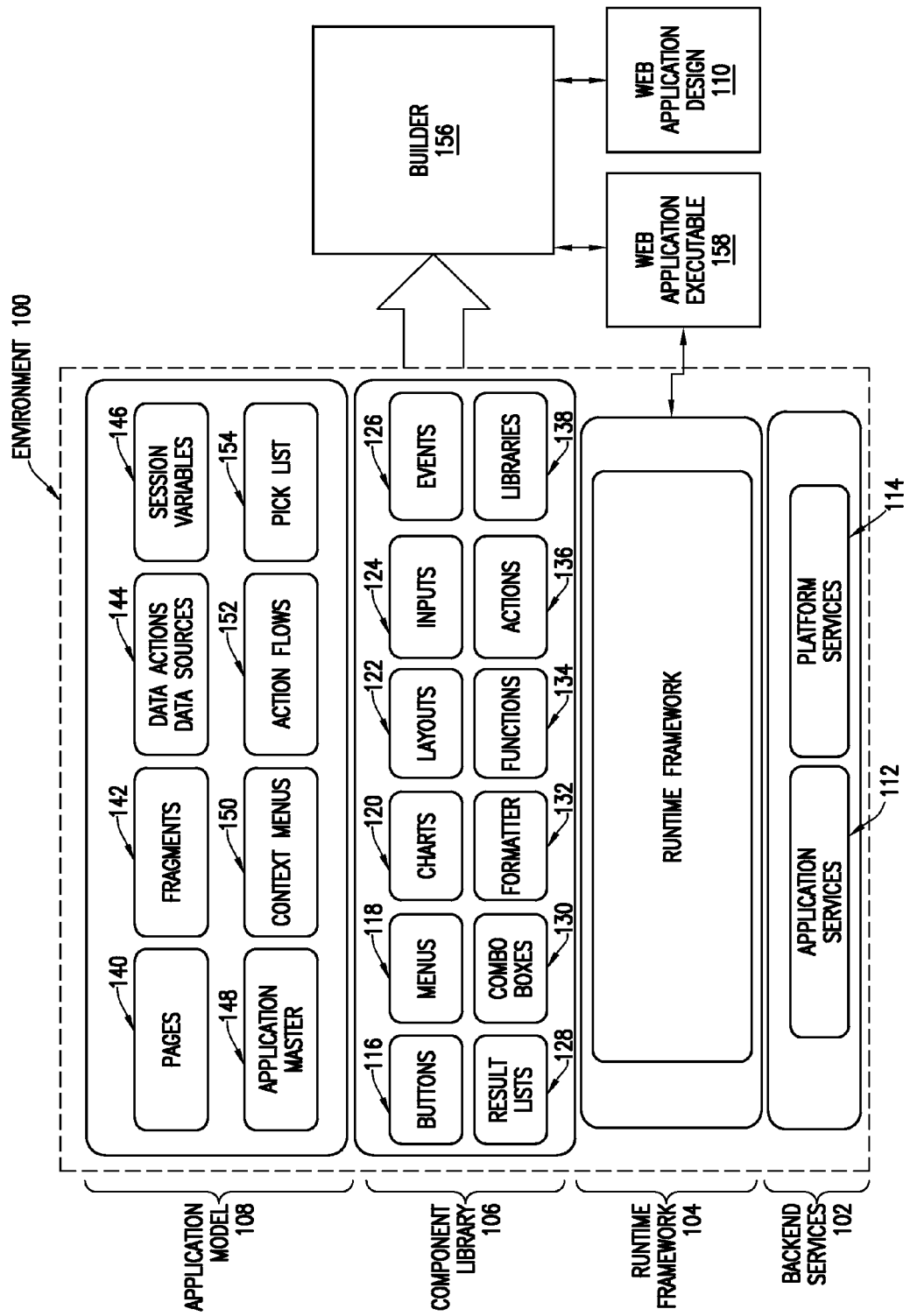
FIGS. 1, 2, and 3 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments are directed to process fragment management of allowing for process fragment reuse between processes. A process fragment is a portion of a process that may have more than one input control point and more than one output control point. During execution of a parent process, a first process fragment expression is obtained and executed. The execution of the process fragment results in an identifier of a process fragment. Based on the identifier, a process fragment is selected from multiple process fragments. Further, the input control point is selected for the process fragment, and the process fragment is executed. Similarly, the input control point of the parent process that corresponds to an output control point of the process fragment is identified. Execution returns to the parent process starting at the input control point of the parent process.

FIG. 1 shows a schematic diagram of a system in accordance with one or more embodiments of the technology. Specifically, FIG. 1 shows a schematic diagram of an environment (100) for developing and executing a web application that implements the process fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface components and processing components.

In one or more embodiments of the technology, user interface components are components that are displayed to an end user. In other words, instances of the user interface components are displayed on a display device. In one or more embodiments of the technology, the user interface components may include, but are not limited to, buttons (116) (e.g., radio buttons, common buttons), menus (118) (e.g., drop down menu, check boxes), charts (120), layouts (122), inputs (e.g., fields) (124) and combo boxes (130). User interface components in the component library may each be associated with a set of options. The set of options define the execution of the user interface component. Namely, the set of options define how a particular instance of the component is executed. Options associated with the user interface components may include formatting, any text that is displayed, any action that is to be performed when the user interface component is selected, other options, and/or any combination thereof. The action may be to: perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility, and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. A fragment (142) represents at least a portion of an activity. In other words, an activity is a defined sequence of actions that an end user may perform using the web application. A fragment is a portion of the defined sequence of actions. Data actions and data sources (144) define the storage structure and storage location of the data and the actions to perform on the data.

Fragments (142) may include a process fragment. A process fragment is a portion of a process. In other words, a process fragment may have more than one defined input control point and more than one defined output control point. The environment (100) includes functionality to allow a developer to drag a template for the fragment (142) from the application model (108) into the web application design (110) using the builder (156), and insert parameters into the template in order to create a process fragment definition. In other words, a process fragment definition is source code that defines a process fragment using templates and an expression based language rather than a programming language in accordance with one or more embodiments of the technology. The process fragment is described in additional detail below and in FIG. 3.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. For example, the context may be a particular user interface component that is selected, the page that is displayed, or another context. The context menu presents options that are specific to the particular context. The manner of selecting the context menu is not dependent on the context. Specifically, an end user may select the context menu in the same way and have different menu options presented based on the context.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a user interface for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The user interface of the builder (156) may include editor features and sub-systems. The editor features may include editors for modifying various aspects or views of the web application design, and/or a builder user interface to assist in the development of the web application design in accordance with one or more embodiments of the technology. For example, the editors may include business objects, documents, cases, searches, reports, pages, roles, apps, widgets, and process editors. The builder user interface may include a new artifact wizard, add-on top-level menu, add-on tool bar buttons, context menus, an artifacts properties page, and a model editor.

A process editor includes functionality to generate a process definition. A process definition is a definition of a business process, which may correspond to a real world business organization's workflow. In other words, the process definition is a set of activities or tasks that are orchestrated based on organization business rules or policies and produce a specific outcome. In one or more embodiments of the invention, tasks in the process definition may be executed by the user or the system by taking some actions on the business data. Execution of the tasks may be sequential and/or parallel. In one or more embodiments, a process definition is in an expression based language and includes logic for executing a process. In one or more embodiments of the technology, the ordering of instructions in a process may not be known until the process is executed.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
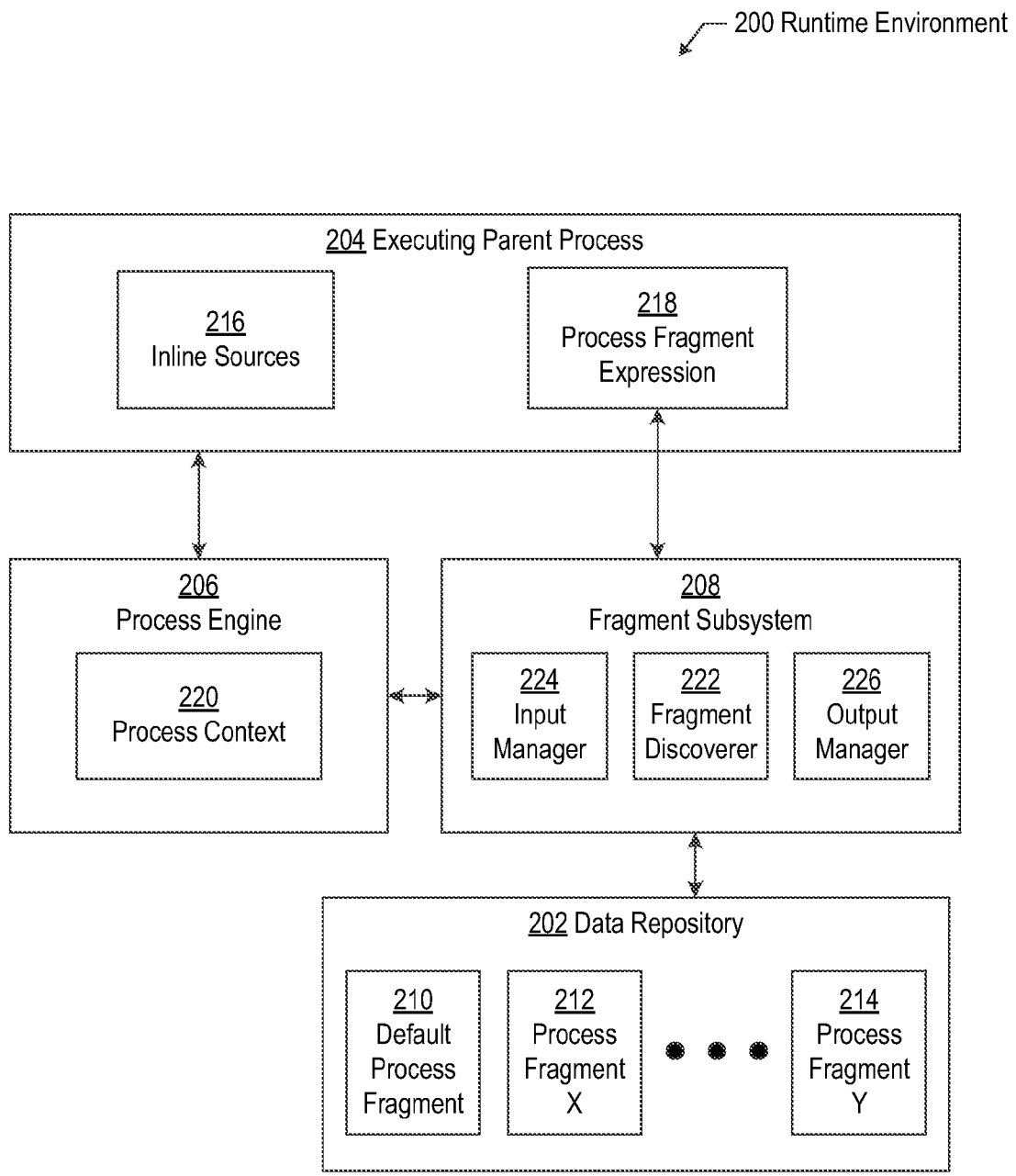

Turning to FIG. 2, FIG. 2 shows a schematic diagram of a runtime environment (200) in accordance with one or more embodiments of the technology. As shown in FIG. 2, the runtime environment includes a data repository (202), an executing parent process (204), a process engine (206), and a fragment subsystem (208). Each of these components is described below.

In one or more embodiments of the technology, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. In one or more embodiments of the technology, the data repository (202) includes functionality to store multiple process fragments (e.g., process fragment X (212), process fragment Y (214), default process fragment (210)) including a default process fragment (210). Each process fragment is related to a unique identifier of the process fragment. The unique identifier may be any alphanumeric, binary, or otherwise symbolic identifier of the process fragment.

A default process fragment (210) is a process fragment that is used when no other process fragment applies. In one or more embodiments, a default process fragment may be defined within the code of the parent process. In one or more embodiments, the default process fragment may be separate from the parent process. The process fragment is described in further detail below and in FIG. 3.

Continuing with FIG. 2, an executing parent process (204) is a process that incorporates a process fragment. In other words, an executing parent process references a process fragment. The executing parent process (204) includes inline sources (216) and a process fragment expression (218). Inline sources are any sources of data that are present in the parent process. For example, the inline sources may be graphical user interface widgets displayed on one or more pages of the process, data items defined within the process fragment, and any other source of data.

A process fragment expression (218) is an expression for selecting a process fragment from the set of process fragments (e.g., process fragment X (212), process fragment Y (214)). In particular, a process fragment expression (218) is a function on data from one or more data sources that maps the data to an identifier of a process fragment. The process fragment expression (218) may include references to one or more data sources and describe one or more operations to perform on data from the one data sources. The data sources may be inline sources (216), the process context (220), one or more data repositories, or a combination thereof. The output of the process fragment expression is an identifier of a process fragment.

In one or more embodiments of the invention, the process fragment expression may include a loop expression, whereby execution of the process fragment repeats until a condition is satisfied. The condition may be, for example, on a result of an expression, processed output data from the process fragment, a static value, or another condition or a combination thereof.

In some embodiments of the technology, the process fragment expression is limited to output of only valid process fragments that are within the scope of the web application. In some embodiments, the process fragment expression may be limited to the set of process fragments specifically identified by the developer. Other limits on the process fragments may alternatively or additionally exist without departing from the scope of the technology.

Although FIG. 2 shows the executing parent process and process fragment as separate components, a process fragment may be an executing parent process. For example, an executing parent process may include a process fragment expression that, when executed, references a first process fragment. The first process fragment may also include another process fragment expression that, when executed, references a second process fragment. In the example, the first process fragment is a executing parent process to the second process fragment.

Continuing with FIG. 2, a process engine (206) is operatively connected to the executing parent process (204). The connection may be direct or indirect. Further, the process engine (206) may be on a local computing device executing a browser that has the executing parent process (204). The process engine (206) may be hardware, software, firmware, or a combination thereof that includes functionality to manage execution of the executing parent process (204). In particular, the process engine (206) includes functionality to maintain a process context (220).

The process context (220) is any information about the execution of the executing parent process and the process fragment. For example, the process context may include parameter values describing environmental information, such as session identifier, user identifier of a user, identifier of a current instruction being executed, browser information, value of various variables, and any other state information describing the execution environment and execution of the process.

The process engine (206) and the executing parent process (204) are also operatively connected to a fragment subsystem. The fragment subsystem (208) may be hardware, software, firmware, or a combination thereof that includes functionality to manage the selection and execution of a process fragment based on the process fragment expression (218). In particular, the fragment subsystem (208) includes a fragment discoverer (222), an input manager (224), and an output manager (226).

The fragment discoverer (222) includes functionality to select the process fragment based on the process fragment expression (218). The input manager (224) manages selecting the input control point (discussed below and in FIG. 3) and passing inputs between the executing parent process and the process fragment. The output manager (226) includes functionality to identify an output control point (discussed below and in FIG. 3) of the process fragment, select the input control point for the executing parent process and pass outputs between the process fragment and the executing parent process.

Figure 3:
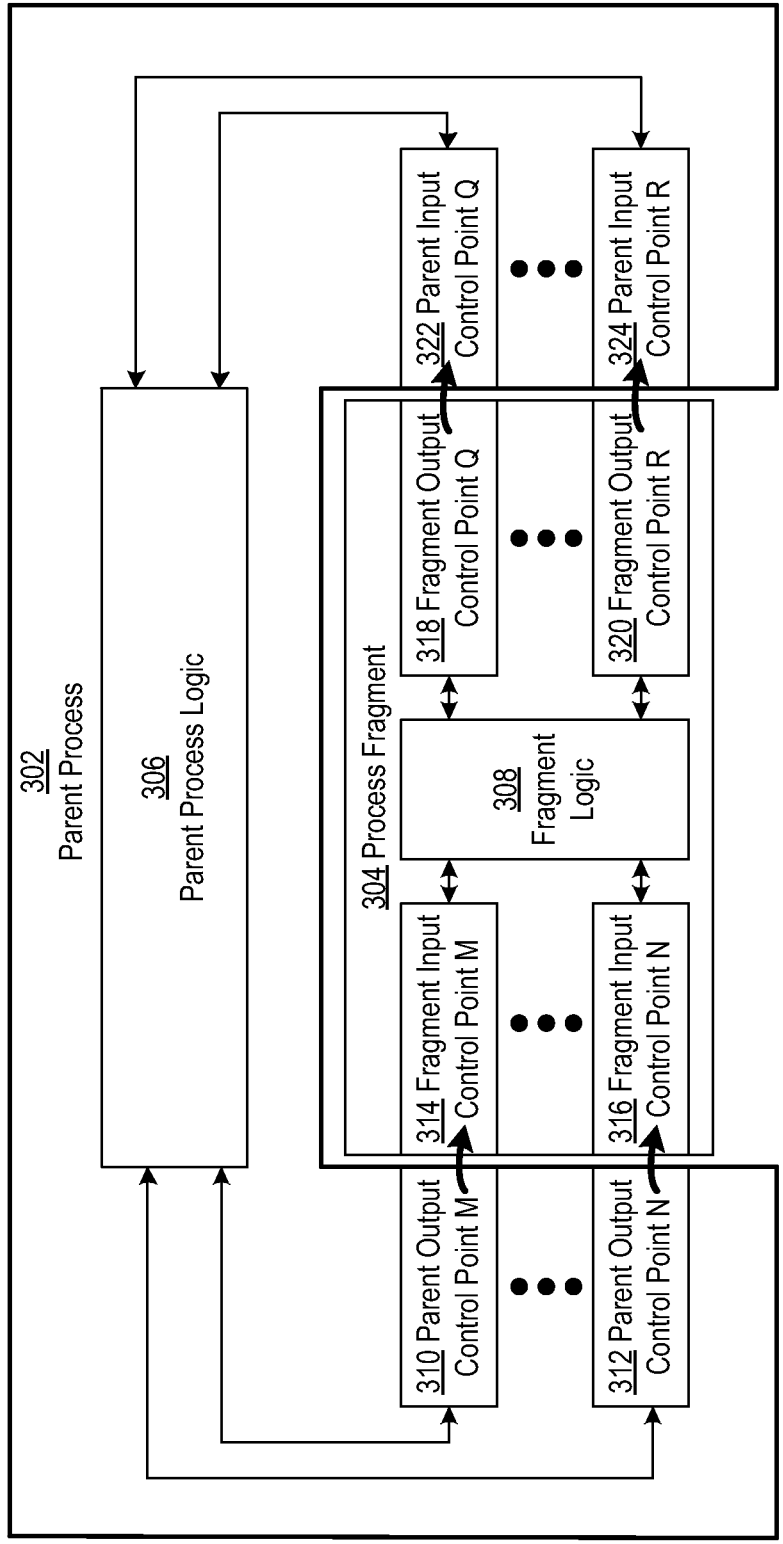

FIG. 3 shows a schematic diagram of a system when a particular process fragment is selected in accordance with one or more embodiments of the technology. As shown in FIG. 3, both the parent process (302) and the process fragment (304) have logic (e.g., parent process logic (306), fragment logic (308)). The logic corresponds to the instructions of the parent process or process fragment that cause the performance of the features of the corresponding process. In other words, the logic corresponds to the finite set of instructions, which when executed, perform various steps to achieve the goal of the corresponding process. Thus, the parent process logic (306) corresponds to the set of instructions, which, when executed, perform the steps of the parent process (302). Similarly, the process fragment logic (304) corresponds to the set of instructions which, when executed, perform the steps of the process fragment (308).

The parent process (302) includes parent output control points (e.g., parent output control point M (310), parent output control point N (312)) and parent input control points (e.g., parent input control point Q (322), parent input control point R (324)). A parent output control point is an instruction which may transfer execution to a process fragment (304). As shown, the parent process may have multiple output control points (e.g., parent output control point M (310), parent output control point N (312)), which each correspond to separate instructions. Control refers to the instruction or sequence of instructions that is being executed by a processor.

A parent input control point (e.g., parent input control point Q (322), parent input control point R (324)) corresponds to an instruction to which execution may be returned from the process fragment (304). In other words, when execution of the process fragment completes, the execution may return to any of the parent input control points (e.g., parent input control point Q (322), parent input control point R (324)). More particularly, the same instance of a process fragment expression in the parent process may result in control being returned to any of various parent input control points. In one or more embodiments of the technology, a mapping does not exist between the parent output control point (e.g., parent output control point M (310), parent output control point N (312)) and the parent input control point (e.g., parent input control point Q (322), parent input control point R (324)), except through the execution of the process fragment. Thus, the parent input control point may not be a priori determined from the parent output control point without executing the parent process (302) and/or the process fragment (304). For example, if parent output control point M (310) passes control to the process fragment (304), then after execution of the process fragment, control may be returned to any of parent input control point Q (322), parent input control point R (324), or any other parent input control point.

The process fragment includes fragment input control points (e.g., fragment input control point M (314), fragment input control point N (316)) and fragment output control points (e.g., fragment output control point Q (318), fragment output control point R (320)). A fragment input control point is an instruction which may receive execution from the parent process (302). As shown, the process fragment (304) may have multiple fragment input control points (e.g., fragment input control point M (314), fragment input control point N (316)), which each correspond to separate instructions. Thus, the initial instruction executed when control transfers to the process fragment is any of the fragment input control point M (314), fragment input control point N (316), or any other fragment input control point. As shown, rather than a subroutine or method that has only a single control point to which control may be transferred, a process fragment may have multiple possible input control points.

A fragment output control point (e.g., fragment output control point Q (318), fragment output control point R (320)) corresponds to an instruction that may be the last instruction executed when execution of the process fragment (304) completes. In other words, when execution of the process fragment completes, the last instruction executed may be any of the fragment output control points (e.g., fragment output control point Q (318), fragment output control point R (320)). In one or more embodiments of the technology, a mapping does not exist between the fragment input control point (e.g., fragment input control point M (314), fragment input control point N (316)) and the fragment output control point (e.g., fragment output control point Q (318), fragment output control point R (320)), except through the execution of the process fragment given a set of inputs. For example, if fragment input control point N (316) receives control from the parent process (302), then after execution of the process fragment, control may end at any of fragment output control point Q (318), fragment output control point R (320), or any other fragment output control point.

In one or more embodiments of the technology, a mapping exists between parent output control points (e.g., parent output control point M (310), parent output control point N (312)) and fragment input control points (e.g., fragment input control point M (314), fragment input control point N (316)). Similarly, a mapping may exist between fragment output control points (e.g., fragment output control point Q (318), fragment output control point R (320)) and parent input control points (e.g., parent input control point Q (322), parent input control point R (324)). The mapping may be based, for example, on identical unique part or whole identifiers of the control points, or a table that maps identifiers of output control points to input control points. Other mappings may be used without departing from the scope of the technology.

Rather than a one-to-one mapping, the mapping may be a function of the parameters passed between the output control points and input control points. In such a scenario, parent output control points may map to any of fragment input control point M, parent input control point N, or other parent input control point based on the values of the parameters. As discussed above, data structure, input manager, other component, or a combination thereof may maintain and/or perform the mapping. In such a scenario, the number of parent output control points may differ from the number of fragment input control points, and the number of fragment output control points may differ from the number of parent input control points.

While FIGS. 1-3 show a configuration of components, other configurations may be used without departing from the scope of the technology. For example, various components may be combined to create a single component. As another example, the functionality performed by a single component may be performed by two or more components.

Figure 4:
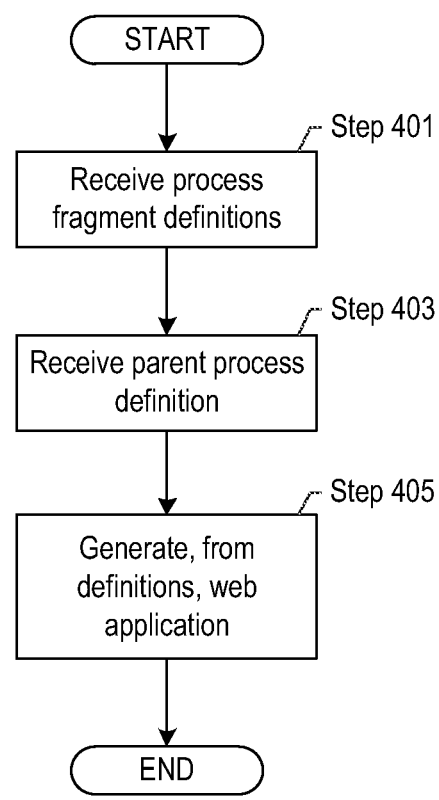
FIGS. 4 and 5 show flowcharts in accordance with one or more embodiments of the technology.
Figure 5:
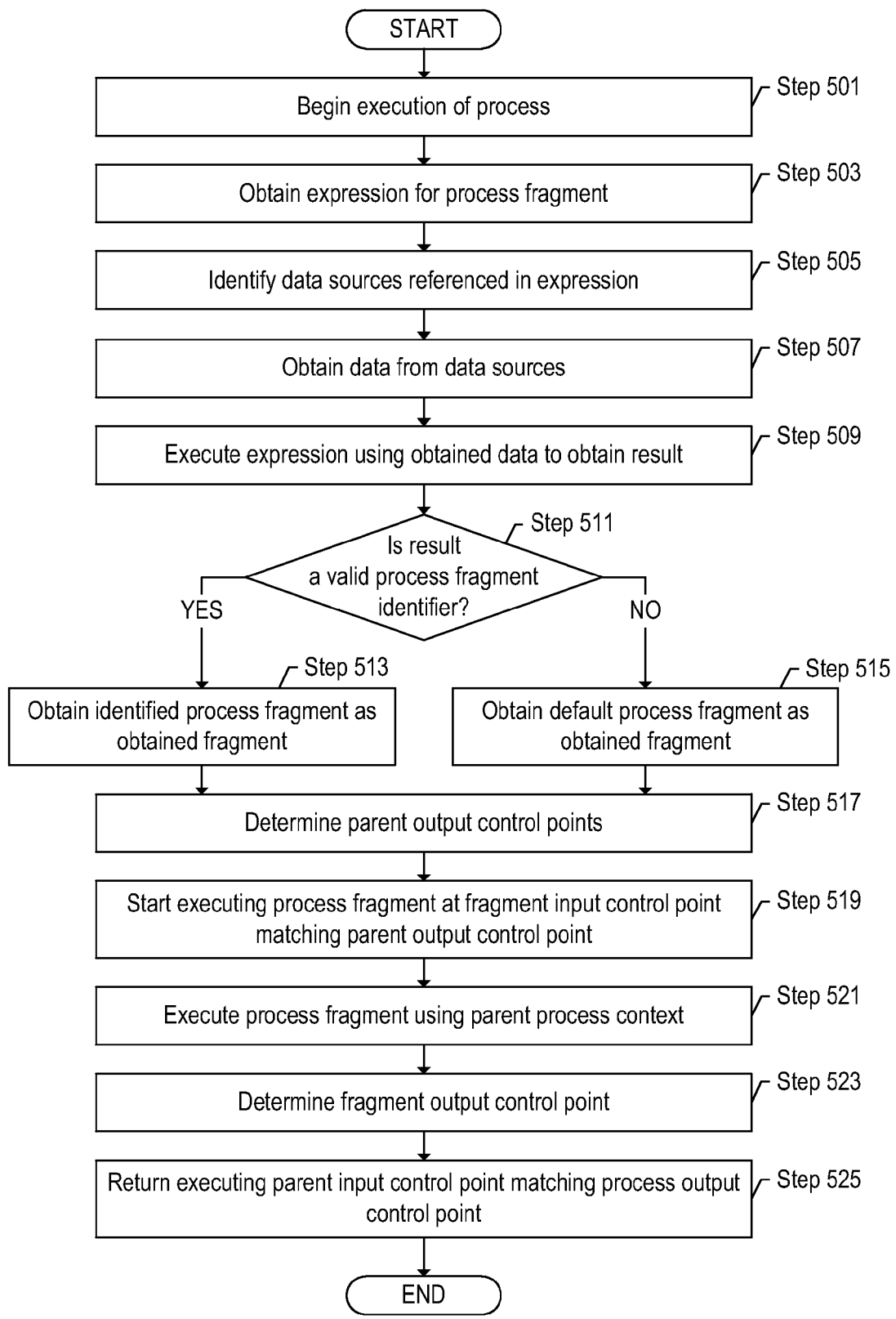

FIGS. 4 and 5 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows a flowchart for generating a web application design in accordance with one or more embodiments of the technology. In Step 401, one or more process fragment definitions are received in accordance with one or more embodiments of the technology. In particular, the development environment shown in FIG. 1 facilitates an expression based development of a web application. Thus, using the developer tools offered by the development environment, a user may drag and drop components into a web application design to define various components of the web application design. Some of the components may have predefined templates and logic. In such a scenario, once dragged into the web application design, the user may submit values of various parameters of the components. For example, the user may submit a unique identifier, any references, or any other information.

For processes and process fragments, some steps of the process or process fragments have predefined sets of instructions and may be represented as a box. Thus, a user may simply drag the step to the web application design, add in a line connector to link the prior step before the dragged step, and a line connector to link the step to be executed after the dragged step. Further, the user may insert into widgets of the developer environment, one or more parameters for the step. For example, a verify step may involve multiple instructions about various types of verification. The user may drag a box representing the verify step to the user's web application design, link the box to other steps, and add parameters describing what is verified and what is being verified against.

Within the developer environment, the builder may maintain an internal version of the web application design, such as in extensible markup language (XML) format that describes the web application design.

Thus, receiving the process fragment definition may include receiving the developer's input through the graphical user interface of the developer environment and generating the internal version of the web application design while the web application design is being developed. In one or more embodiments of the technology, the developer may generate multiple process fragment definitions. Further, in accordance with one or more embodiments of the technology, one or more of the process fragment definitions may be copied from other processes or process fragments. For example, the developer may select a portion of a process or process fragment using the graphical user interface of the developer environment and copy the selection to a new definition. The developer may make any further modifications of the copied process fragment definition(s).

In creating the process fragment definitions, one or more input control points and one or more output control points may be defined. Each of the input control points and output control points may be associated with a unique identifier in the process fragment definition.

In Step 403, one or more parent process definition are received in accordance with one or more embodiments of the technology. Receiving the one or more parent process definitions may be performed in a same or similar manner discussed above with reference to Step 401. In particular, the developer may provide the definition through the graphical user interface of the developer environment as discussed above, and the builder may generate the internal version. As part of generating the parent process definition, the developer may include a process fragment expression. In other words, the developer may include a placeholder in the parent process definition for a process fragment and specify the process fragment expression using an expression based language. Specifying the process fragment expression may include defining one or more operations and sources of data for selecting the process fragment. The developer may also define a default process fragment definition. With each parent process output control point and each parent process input control point, the developer may provide a unique identifier that maps to the process fragment input control point and the process fragment output control point.

Steps 401 and 403 may be performed multiple times to create additional parent processes definitions and process fragment definitions. Further, additional steps may be performed to create and receive the web application design.

In Step 405, a web application is generated from the web application design in accordance with one or more embodiments of the technology. In one or more embodiments of the technology, generating the web application includes translating the internal version of the web application into a computer programming language set of instructions. The generation may be based on predefined templates of code for each portion of the web application design. The templates may be ordered according to the web application design and populated with parameters in the web application design.

As shown in FIG. 4, one or more embodiments may allow reuse of portions of processes through a graphical user interface development environment that uses dragging and dropping of web application components and expression based insertion of parameters. Once the web application is built, the web application may be executed.

FIG. 5 shows a flowchart for executing a process of a web application. FIG. 5 may be performed, for example, using the components discussed above with reference to FIG. 2. In Step 501, a process is executed in accordance with one or more embodiments of the technology. In particular, control transfers to a parent process which starts executing. The parent process may have various input parameters, data values that are received, or other values that are calculated by the parent process. Thus, execution of the parent process is performed through an execution path based on the various sources of input data.

In Step 503, an expression for a process fragment is obtained in accordance with one or more embodiments of the technology. In other words, during execution, a process fragment expression is obtained as the next instruction or set of instructions to execute.

In Step 505, data sources in the process fragment expression are identified in accordance with one or more embodiments of the technology. In one or more embodiments of the technology, the expression may reference inline data sources and/or external data sources.

In Step 507, data is obtained from the one or more data sources according to the process fragment expression. For example, the data may be obtained by accessing inline data sources, a data repository to identify user data, the values of process context variables, the values of fields within the page, other data source, or a combination thereof.

In Step 509, the expression is executed using the obtained data to obtain a result in accordance with one or more embodiments of the technology. Executing the expression may include performing one or more operations in the expression. For example, the operations may include comparing data from a data source to a value, and selecting a process fragment if the data matches. As a result of executing the expression, a result is obtained. The result may be a unique identifier of an existing process fragment, a unique identifier of the default process fragment, an incorrect identifier, or an error identifier in accordance with one or more embodiments of the technology.

In Step 511, a determination is made whether the result is a valid process fragment identifier in accordance with one or more embodiments of the technology. In other words, a determination is made whether the result references a valid process fragment.

If the result is a valid process fragment identifier, the flow proceeds to Step 513. In Step 513, the identified process fragment is obtained as an obtained fragment in accordance with one or more embodiments of the technology. In other words, the process fragment corresponding to the process fragment identifier is obtained from the data repository.

If the result is not a valid process fragment identifier, then the flow proceeds to Step 515. In Step 515, the default process fragment is obtained as the obtained process fragment. The default process fragment may be defined within the parent process, in which the default process fragment is the next instruction in the parent process that is set as the default. Alternatively, the default process fragment may be obtained from the data repository.

Regardless of whether an identified process fragment is obtained or the default process fragment is obtained, the flow may proceed to Step 517. In Step 517, parent output control point is determined. In other words, the unique identifier of the parent output control point is obtained based on the execution of the parent process.

In Step 519, the process fragment starts execution at the fragment input control point matching the parent output control point in accordance with one or more embodiments of the technology. If the match is based on having a unique all or part of the identifier of the parent output control point, then the fragment input control point that has all or part of the identifier is selected. If the match is based on a mapping, then a data structure may be accessed to identify the fragment input control point that maps to the parent output control point. If the match is based on an expression and parameters, then the expression may be executed in a same or similar manner to executing the process fragment expression to obtain the unique identifier.

In Step 521, the process fragment is executed using the parent process context in accordance with one or more embodiments of the technology. In other words, the process fragment logic is executed. Various control paths may be taken during the execution of the process fragment. Further, the process fragment may be executed as if the process fragment were a part of the parent process. For example, the execution may be using a pass by reference of all process context parameters in the parent process to the execution of the process fragment. Alternatively, the execution may be using a pass by value of all or a subset of the process context parameters.

In one or more embodiments of the invention, if the process fragment expression includes a loop expression, execution of the process fragment repeats until the condition is satisfied. In other words, at each execution of the process fragment, a determination is made whether the condition is satisfied. If the condition is not satisfied, then execution of the process fragment may repeat. If the condition is satisfied, then the flow may proceed to Step 523.

In Step 523, the fragment output control point is determined in accordance with one or more embodiments of the technology. Step 523 may be performed in a same or similar manner discussed above with reference to Step 517.

In Step 525, execution is returned to the parent process at the parent process input control point matching the fragment output control point. In other words, execution returns to the parent process. Because different control paths may be taken during the execution of the process fragment, the position in which execution returns may not be known until execution of the process fragment completes. If the match is based on having a unique all or part of the identifier of the fragment output control point, then the parent input control point that has all or part of the identifier is selected. If the match is based on a mapping, then a data structure may be accessed to identify the parent input control point that maps to the fragment output control point. If the match is based on an expression and parameters, then the expression may be executed in a same or similar manner to executing the process fragment expression to obtain the unique identifier.

FIGS. 6.1 and 6.2 show an example in accordance with one or more embodiments of the technology. FIGS. 6.1 and 6.2 may be examples of the components discussed above and in FIGS. 1-3. The following example discussed below and shown in FIGS. 6.1 and 6.2 is for explanatory purposes only and not intended to limit the scope of the technology.

FIG. 6.1 shows an example process fragment definition (600) as defined in the developer environment in accordance with one or more embodiments of the technology. In the example, the process fragment has a fragment input control point (602) that leads to a decision box of whether to perform a validation. If the determination is made to perform a validation, the process fragment indicates control flows to box (604), which corresponds to displaying a page for a clerk or other end user to perform the validation. Control then proceeds according to the process fragment definition to box (606) to determine whether validation is successful. If validation is not successful, then the flow proceeds to box (610) which is a fragment output control point.

If validation is successful in box (606) or a determination is made not to perform the validation, then the process fragment definition transfers control to box (608) to create a request using the data. Flow then proceeds to box (612) as the fragment output control point.

FIG. 6.2 shows an example parent process definition (620) with the process fragment definition in FIG. 6.1 incorporated for illustrative purposes. As shown in FIG. 6.1, in box (622) after initiating parent process, control flows to check user information. Check user information may be a parent output control point that leads to a fragment input control point. After execution of the process fragment completes, flow may proceed starting with having a manager approve a request as one parent input control point in box (624) or to inform customer service as another parent input control point in box (626). Thus, depending on the actual execution of the process fragment, control may proceed to different parts of the parent process as the first instruction executed. As shown in the example, a process fragment is a portion of the process which may have different input control points for both the process fragment and/or the parent process. Thus, one or more embodiments allow for code reuse of process fragments.

Figure 7:
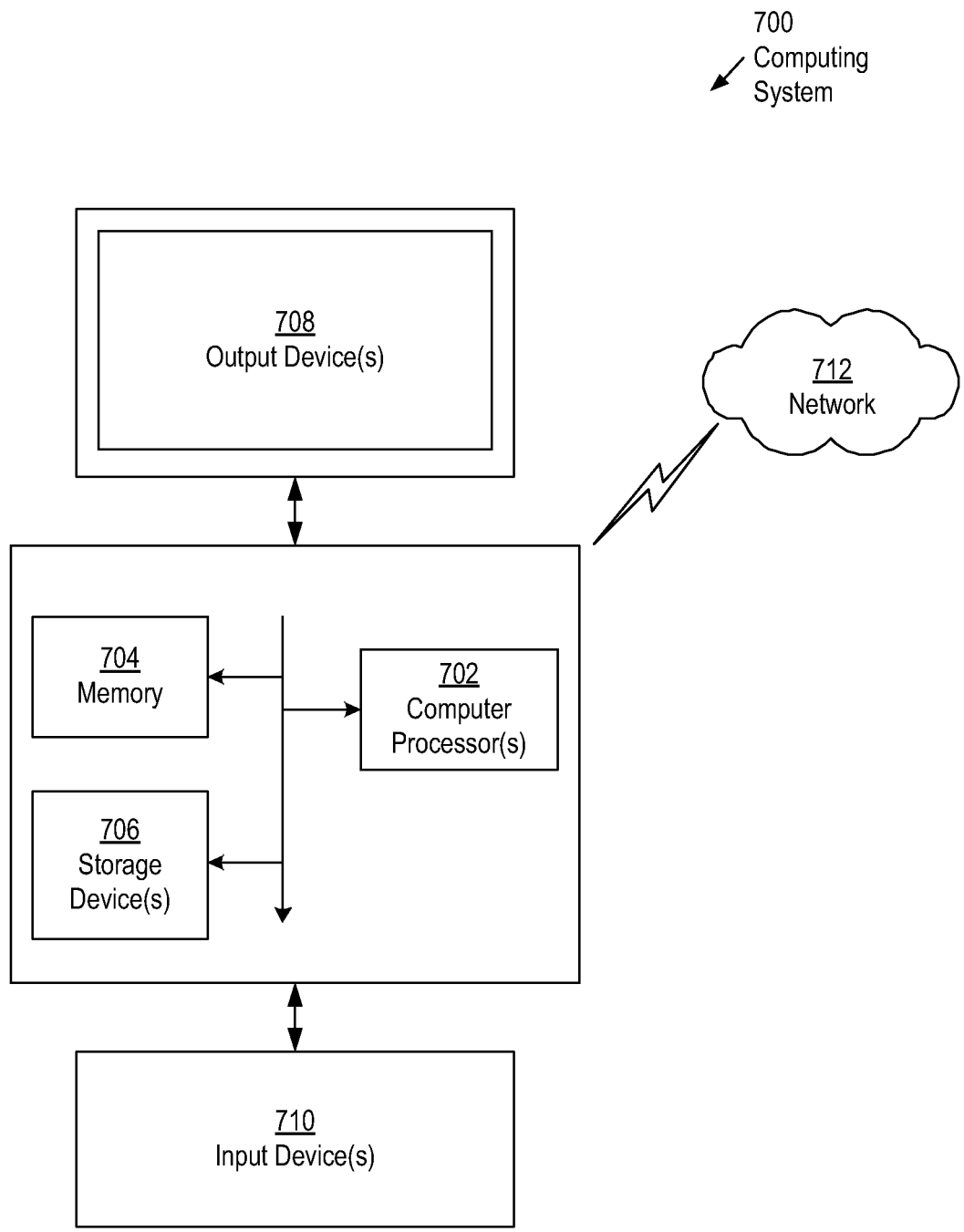
FIG. 7 shows a computing system in accordance with one or more embodiments of the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for process fragment management comprising:
    obtaining, during execution of a first parent process, a first process fragment expression;
    executing the first process fragment expression using first data gathered from a first data source to obtain a first process fragment identifier;
    selecting, from a plurality of process fragments, a first process fragment corresponding to the first process fragment identifier;
    executing the first process fragment, wherein execution completes at a first fragment output control point of a plurality of fragment output control points; and
    selecting, from a plurality of parent input control points of the first parent process, a first parent input control point matching the first fragment output control point;
    continuing execution of the first parent process at the first parent input control point when execution of the first process fragment completes.

2. The method of claim 1, further comprising:
    selecting, from a plurality of fragment input control points of the first process fragment, a fragment input control point; and
    starting execution of the first process fragment at the fragment input control point.

3. The method of claim 1, wherein executing the first process fragment expression comprises:
    performing an operation in the first process fragment expression that identifies an invalid process fragment based on the first data, and
    selecting a default process fragment identifier as the first process fragment identifier,
    wherein executing the first process fragment comprises executing a default process fragment in the first parent process based on the default process fragment identifier.

4. The method of claim 1, wherein executing the first process fragment expression comprises:
    performing an operation in the first process fragment expression that identifies the first process fragment identifier.

5. The method of claim 4, further comprising:
    gathering the first data from an internal source within the first parent process,
    wherein performing the operation uses the first data from the internal source.

6. The method of claim 4, further comprising:
    gathering the first data from a process context of the first parent process, wherein performing the operation uses the first data from the process context.

7. The method of claim 1, further comprising:
    obtaining, during execution of a second parent process, a second process fragment expression;
    executing the second process fragment expression using second data gathered from a second data source to obtain the first process fragment identifier;
    selecting, from the plurality of process fragments, the first process fragment corresponding to the first process fragment identifier;
    executing the first process fragment; and
    continuing execution of the second parent process when execution of the first process fragment completes.

8. The method of claim 1, further comprising:
    obtaining, during execution of a second parent process, a second process fragment expression;
    executing the second process fragment expression using second data gathered from a second data source to obtain the first process fragment identifier;
    selecting, from the plurality of process fragments, the first process fragment corresponding to the first process fragment identifier;
    selecting, from a plurality of fragment input control points of the first process fragment, a fragment input control point of the first process fragment;
    executing the first process fragment starting at the fragment input control point; and
    continuing execution of the second parent process when execution of the first process fragment completes.

9. The method of claim 1, further comprising:
  executing the first process fragment expression using second data gathered from a second data source to obtain a second process fragment identifier;
  selecting, from the plurality of process fragments, a second process fragment corresponding to the second process fragment identifier;
  executing the second process fragment, wherein execution completes at a second fragment output control point; and
  selecting, from the plurality of parent input control points, a second parent input control point matching the second fragment output control point;
  continuing execution of the first parent process at the second parent input control point when execution of the second process fragment completes.

10. The method of claim 1, wherein the first process fragment expression comprises a loop expression based on a condition, wherein the method further comprises repeating executing the first process fragment until the condition is satisfied.

11. A system for process fragment management comprising:
  a data repository for storing a plurality of process fragments;
  a computer processor; and
  memory comprising instructions for a fragment subsystem that, when executed on the computer processor:
    obtains, during execution of a first parent process, a first process fragment expression,
    executes the first process fragment expression using first data gathered from a first data source to obtain a first process fragment identifier,
    selects, from the plurality of process fragments in the data repository, a first process fragment corresponding to the first process fragment identifier,
    selects, from a plurality of fragment input control points of the first process fragment, a first fragment input control point of the first process fragment,
    executes the first process fragment starting at the first fragment input control point, and
    continues execution of the first parent process when execution of the first process fragment completes.

12. The system of claim 11, wherein the fragment subsystem further:
  determines a fragment output control point, and
  returns executing the first parent process at a parent input control point matching the fragment output control point.

13. The system of claim 11, wherein executing the first process fragment expression comprises:
  performing an operation in the process fragment expression that identifies an invalid process fragment based on the first data, and
  selecting a default process fragment identifier as the process fragment identifier,
  wherein executing the first process fragment comprises executing a default process fragment in the first parent process based on the default process fragment identifier.

14. The system of claim 11, wherein executing the process fragment expression comprises:
  performing an operation in the first process fragment expression that identifies the first process fragment identifier.

15. The system of claim 14, wherein the fragment subsystem further:
  gathers the first data from an internal source within the first parent process,
  wherein performing the operation uses the first data from the internal source.

16. The system of claim 11, wherein the fragment subsystem further:
  obtains, during execution of a second parent process, a second process fragment expression,
  executes the second process fragment expression using second data gathered from a second data source to obtain the first process fragment identifier,
  selects, from the plurality of process fragments, the first process fragment corresponding to the first process fragment identifier,
  selects, from the plurality of fragment input control points of the first process fragment, the first fragment input control point of the first process fragment,
  executes the first process fragment starting at the first fragment input control point, and
  continues execution of the second parent process when execution of the first process fragment completes.

17. The system of claim 11, wherein the fragment subsystem further:
  obtains, during execution of a second parent process, a second process fragment expression,
  executes the second process fragment expression using second data gathered from a second data source to obtain the first process fragment identifier,
  selects, from the plurality of process fragments, the first process fragment corresponding to the first process fragment identifier,
  selects, from the plurality of fragment input control points of the first process fragment, a second fragment input control point of the first process fragment,
  executes the first process fragment starting at the second fragment input control point, and
  continues execution of the second parent process when execution of the first process fragment completes.

18. The system of claim 11, wherein the fragment subsystem further:
  executes the first process fragment expression using second data gathered from a second data source to obtain a second process fragment identifier,
  selects, from the plurality of process fragments, a second process fragment corresponding to the second process fragment identifier,
  selects, from the plurality of fragment input control points of the first process fragment, a second fragment input control point of the second process fragment,
  executes the second process fragment starting at the second fragment input control point, and
  continues execution of the first parent process when execution of the second process fragment completes.

19. A non-transitory computer readable medium for process fragment management comprising computer readable program code for:
  receiving a plurality of process fragment definitions each comprising a plurality of fragment output control points;
  receiving a first parent process definition comprising a first process fragment expression to select a process fragment from the plurality of process fragment definitions, the first parent process definition comprising a plurality of parent input control points; and
  generating, from the plurality of process fragment definitions and the first parent process definition, a web application comprising a plurality of process fragment and a first parent process comprising the first process fragment expression and the plurality of input control points, wherein the plurality of process fragments comprise the plurality of output control points.

20. The non-transitory computer readable medium of claim 19, wherein the instructions are further for:
receiving a second parent process definition comprising a second process fragment expression to select the process fragment from the plurality of process fragment definitions,
wherein generating the web application is further from the second parent process definition.

* * * * *